United States Patent [19]

Tedesco

[11] 3,965,648
[45] June 29, 1976

[54] APPARATUS FOR LOADING FUEL PELLETS IN FUEL RODS

[75] Inventor: Robert J. Tedesco, Coraopolis, Pa.

[73] Assignee: Westinghouse Electric Corporation, Pittsburgh, Pa.

[22] Filed: Jan. 3, 1974

[21] Appl. No.: 430,421

[52] U.S. Cl................................. 53/126; 53/244; 198/220 CA; 198/220 BA
[51] Int. Cl............................................. B65b 63/00
[58] Field of Search............................ 53/126, 244; 198/220 CA, 220 BA

[56] References Cited
UNITED STATES PATENTS

| | | | |
|---|---|---|---|
| 3,212,226 | 10/1965 | Murray et al. | 53/24 |
| 3,668,939 | 6/1972 | Schrader | 198/220 CA X |

*Primary Examiner*—Travis S. McGhee
*Attorney, Agent, or Firm*—J. R. Campbell

[57] ABSTRACT

Apparatus for loading fuel pellets into fuel rods for a nuclear reactor including a base supporting a table having grooves therein for holding a multiplicity of pellets. Multiple fuel rods are placed in alignment with grooves in the pellet table and a guide member channels pellets from the table into the corresponding fuel rods. To effect movement of pellets inside the fuel rods without jamming, a number of electromechanical devices mounted on the base have arms connected to the lower surface of the fuel rod table which cyclically imparts a reciprocating arc motion to the table for moving the fuel pellets longitudinally of and inside the fuel rods. These electromechanical devices include a solenoid having a plunger therein connected to a leaf-type spring, the arrangement being such that upon energization of the solenoid coil, the leaf spring moves the fuel rod table rearwardly and downwardly, and upon deenergization of the coil, the spring imparts an upward-forward movement to the table which results in physical displacement of fuel pellets in the fuel rods clamped to the table surface.

8 Claims, 6 Drawing Figures

APPARATUS FOR LOADING FUEL PELLETS IN FUEL RODS

CROSS REFERENCE TO RELATED APPLICATIONS

This application relates to the disclosure in application Ser. No. 262,377 filed June 13, 1972 by John R. Dazen et al. entitled "NUCLEAR FUEL PELLET LOADING MACHINE" assigned to the same assignee as the present invention.

BACKGROUND OF THE INVENTION

The invention described herein relates to nuclear reactors and more particularly to apparatus for loading fuel pellets into fuel rods prior to installation of the rods in a reactor fuel assembly.

Each fuel rod used in large nuclear reactors of the type designed for generation of electric power contains approximately 240 fuel pellets. These pellets conventionally measure 0.650 inch in length and 0.3674 inch diameter for insertion in a fuel rod having an internal diameter of 0.3719 inch. Such dimensions are typical and it will be understood that a different number and size of pellets may be used in reactors designed for other and different purposes.

Conventional pellet loading apparatus consists of a table supporting a tray having approximately 25 grooves, each about 2 feet long and of a size which accommodates fuel pellets of the above dimensions. Fuel rods on the same or a second, adjacent table are aligned with the grooves and the pellets are then pushed into the fuel rod opening either by hand or automatically by a machine designed for this purpose. As pellets travel through the rod, pellet jamming takes place with sufficient frequency as to impede and occasionally stop the fuel pellet loading operation. Exploration of the causes of jamming has led to the conclusion that pellets which do not have end faces perpendicular to the pellets centerline, i.e., non-square pellet ends, do not exert a uniform force on the end of the next pellet in the fuel rod stack. The angularity between adjacent pellet faces therefore causes the pellets to move off a line parallel with the fuel rod walls with the result that they buckle against the rod inner surface and produce a braking effect. As continued pressure is applied against the pellet stack in the fuel rod, high loading forces are generated which cause the pellet to turn and jam in the rod when acted on by another pellet. This action firmly locks the pellets in a jammed position thus precluding further pellet movement in the fuel rod. To alleviate this situation, it is necessary to vibrate the rod by any one of many different methods to break the jam loose. If this procedure is not successful, the fuel rod must be split open to effect pellet removal since the value of pellets is greater than the value of the fuel rod.

SUMMARY OF THE INVENTION

Briefly stated, the disadvantages described above are overcome by the present invention by providing a pellet and fuel rod holding table which is subjected to reciprocating forces effective in conveying each pellet longitudinally of the table and rod, thus eliminating inter-pellet forces. Electromagnetic apparatus vibrates the table about a pivot to flex springs, which upon removal of the magnetic forces, permits tension in the springs to reverse the direction of table movement to a point past its initial at rest position. This action lifts each pellet from the table groove or fuel rod inner surface and during the time the springs return to their initial position, each pellet is moved to a new position longitudinally in each fuel rod or groove. It will occur to those skilled in the art that cyclical operation of the apparatus is carried out to advance pellets on the table and in the fuel rods, and for removing pellets which are pinned or otherwise lodged in fuel rods.

An object of the invention therefore is to provide an operating structure which is effective in moving pellets in a fuel rod without binding the pellets to the fuel rod inner surface.

Another object of the invention is to provide apparatus which is effective in loading or unloading fuel pellets into or from fuel rods in a fraction of the time previously required by prior art devices.

BRIEF DESCRIPTION OF THE DRAWINGS

While the specification concludes with claims particularly pointing out and distinctly claiming the subject of the invention, it is believed the invention will be better understood from the following description taken in connection with the accompanying drawings wherein:

DESCRIPTION OF THE PREFERRED EMBODIMENT

Figure 1:
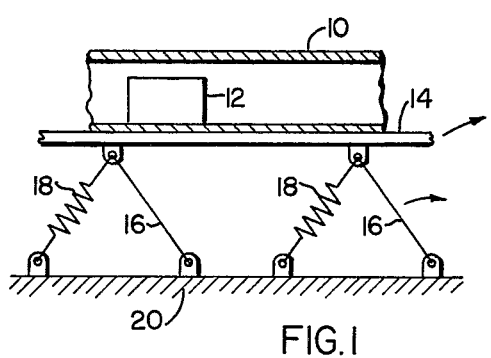
FIGS. 1 through 4 schematically illustrate how the application of force to a table supporting a fuel rod causes a pellet therein to be moved longitudinally in the fuel rod.

Referring now to the drawings wherein like reference characters designate like or corresponding parts throughout the several views, there is shown in FIGS. 1 through 4 a schematic showing of how pellets are moved longitudinally in a fuel rod not only to properly load or unload the rod with pellets but to eliminate pellet jamming problems inherent in prior art structures. As indicated above, exploration, of this problem has resulted in a determination that pellet jamming is caused by non-square ends on opposite sides of the pellet body.

The design disclosed herein eliminates jamming conditions and FIGS. 1 through 4 illustrate the concept on which the structure is based. A fuel rod 10 having a pellet 12 therein is immovably attached to the top surface of a table 14 which is supported by an electromagnetic or other force producing device herein shown as links 16 and springs 18 attached to a base structure 20. When in the at-rest position, springs 18 are only slightly deflected by the weight of the table, fuel rods and pellets. The springs are then further deflected by electromagnetic or other means, thus drawing the table to the left, i.e., rearwardly and downwardly about pivot point 22, as illustrated in FIG. 1.

Figure 2:
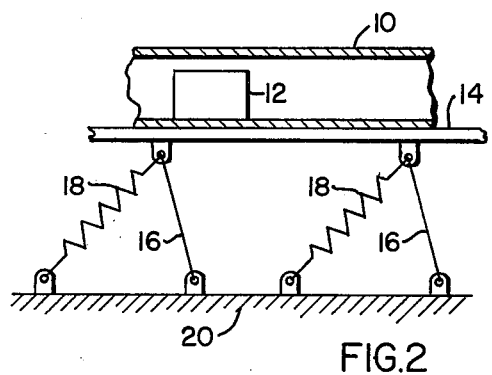
Figure 3:
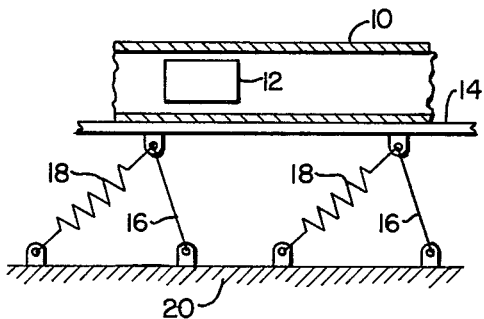
Figure 4:
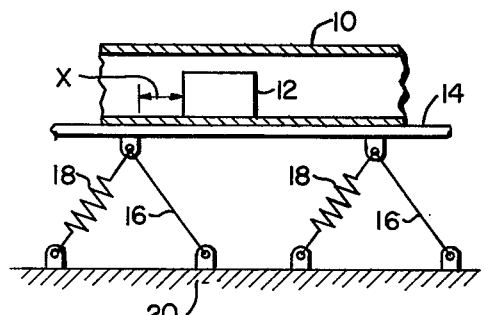

Upon removal of the deflecting force, the energy imparted to the springs is released, thus causing the table to move to the right, i.e., upwardly and forwardly about pivot points 22, as illustrated in FIG. 2. During such forward movement, the pellet moves forwardly with the fuel rod but remains in a stationary position therein because of the friction forces between the pellet outer surface and fuel rod inner surface. At the top of its arc, the force F dissipates itself but the pellet continues to move at an acceleration greater than 1g. Since the springs have been flexed past their neutral point, the energy in the springs effects movement of the table rearwardly toward its initial position. Simultaneously, and as illustrated in FIG. 3, the frictional force between the fuel rod surface and the outer surface of the pellet is broken and for an instant, the pellet floats free in the fuel rod. As the table and therefore the fuel rod is then withdrawn and lowered, the pellet continues its arc and comes to rest at some distance further down the fuel rod as shown by X in FIG. 4. Repetition of this cycle results in pellet displacement equal to a second distance X, not shown, and subsequent cycles therefore cause the pellet to travel the length of the fuel rod until it abuts a stop normally provided in the rod end.

Since individual pellets in a fuel rod move independently of one another and over substantially the same distances, there is no substantial interpellet contact. All pellets accordingly move unimpeded along the fuel rod length until they commence forming a stack with the ends of adjacent pellets abutting one another. Further, since pressure is not applied against the ends of any pellet during its course of travel down the fuel rod, there is no opportunity for the pellets to become jammed or otherwise lodged in the rod as is the case when pellets are loaded manually into fuel rods in accordance with the prior art methods. Even if a jam should be initiated for some presently unforseeable reason, the vibratory forces applied to the rod will cause continued free movement of the pellets thus precluding the occurrence of any kind of jamming condition.

Figure 5:
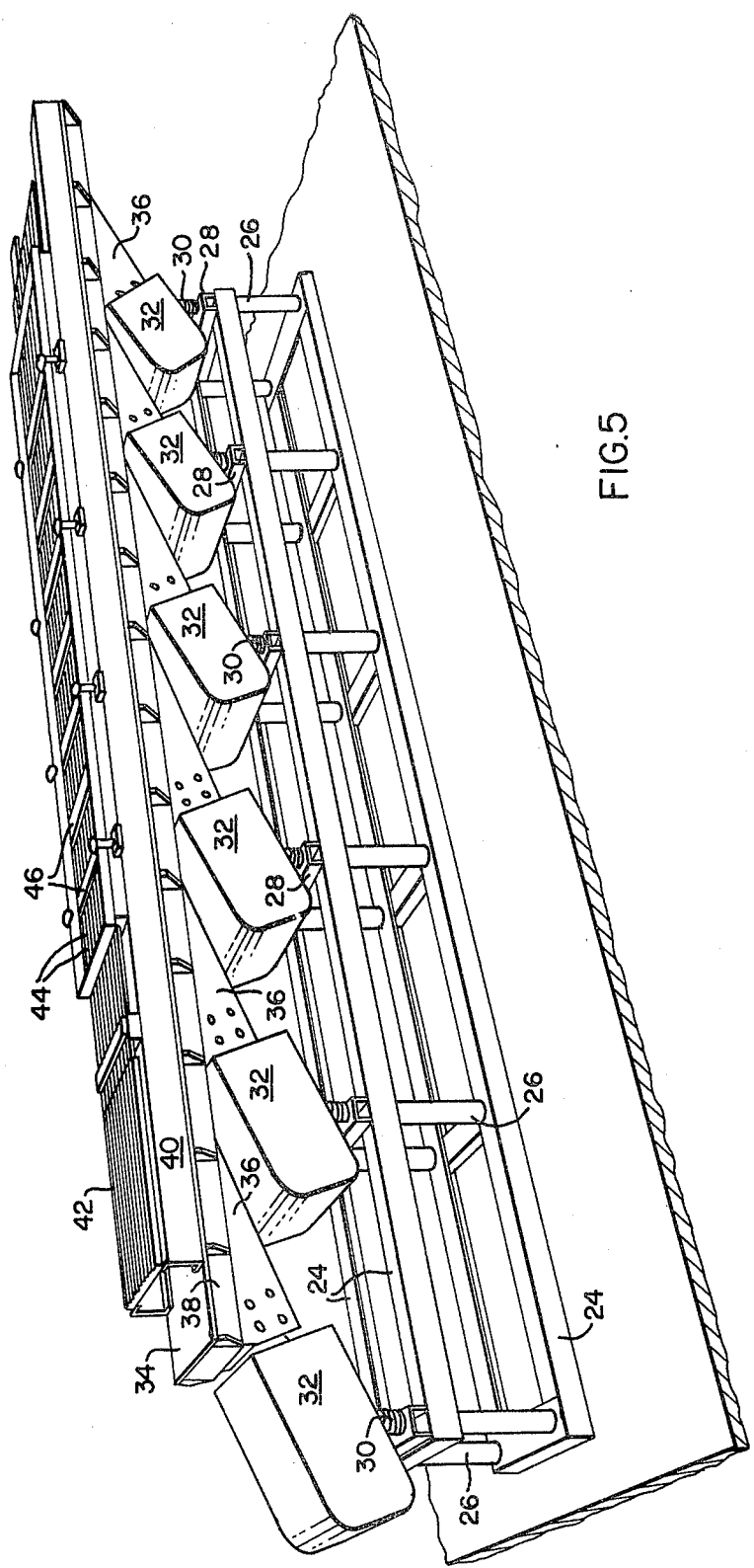
FIG. 5 is isometric isomertric view of a vibratory fuel rod loader of the type used for production purposes.

Referring to FIG. 5, the structure which embodies the above concept and is used for production purposes comprises a rectangular base formed by framing members 24 with vertical supports 26 located therebetween. Horizontally disposed bars 28 bridge the upper framing members and damping springs 30 positioned thereon support multiple electromagnetic vibratory feeders 32 which are directly connected to the underside of frame 34 by brackets 36. The frame 34 is made of steel plates 38 to provide a relatively rigid structure not subject to flexing.

A table 40 supports pellet tray 42 having about 25 grooves which extend across the table width and in a longitudinal direction about two feet. Fuel rods 44 are positioned in similar grooves located in alignment with the fuel pellet grooves. These fuel rods are immovably held on table 40 by clamps 46 or similar securing means. In some cases, it may be desirable to use a funnel type pellet transmechanism of the type disclosed in the above Dazen et al patent application for example, to effect the transfer of fuel pellets from tray 42 to the fuel rods 44 mounted on the table surface.

Figure 6:
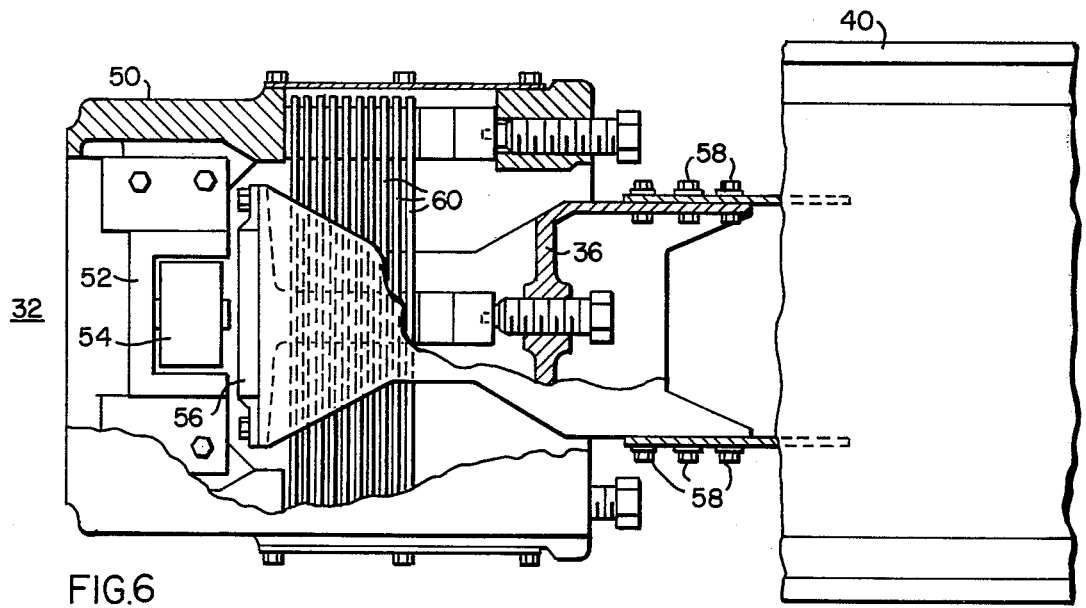
FIG. 6 is a sectional plan view of a commercial electromagnetic vibratory feeder used for vibrating the fuel rod holding and pellet tables.

The electromagnetic vibratory feeders are commercial items manufactured by the Syntron Division of FMC Corporation. As illustrated in FIG. 6, each vibratory feeder 32 comprises a housing 50 which supports a laminated iron core 52 having a coil 54 mounted on the core legs. A movable armature assembly 56 located adjacent the core is equipped with brackets 36 directly connected to the underside of table 40 by bolts 58. Multiple leaf springs 60 having their opposite ends secured in slots in the housing wall, are clamped at their midpoint to connecting bracket 36. The structural arrangement is such that after the armature is moved to the right to displace table 40, the springs 60 serve to return the armature to its initial at-rest position.

The function of the vibratory feeder is to impart vibratory strokes to the fuel rod pellet table 40. This is accomplished by connecting a half wave rectifier (not shown) between a 60 cycle power source and the feeder coil 54. When the coil 54 is energized, the laminated core attracts armature 56 and its connected brackets 36 and table 40 back and down toward the facing core surface. This pulling action flexes the central portion of the spring stack or mass and imparts energy to the stack. As discussed above, pellets lie dormant in the fuel rods during this back-down motion because of friction between each pellet and the fuel rod inner surface.

As the rectifier blocks current flow during the negative half cycle, the core becomes demagnetized thus allowing energy imparted to the spring mass to move the connecting brackets and table in a forward-up direction and through the spring stack neutral position. During such forward-up motion, each pellet remains in contact with the fuel rod inner surface for about one-third of the stroke length. At this point in the stroke, the velocity of the pellet exceeds that of the table and the pellet therefore leaves the fuel rod surface on a free flight trajectory and stays in flight until the table returns to its neutral position to commence the next cycle. The result is pellet movement forwardly in the fuel rod for the distance X shown in FIG. 4.

Since the coil is supplied with 60 cycle current, the table vibrates 3600 times per minute with pellet forward movement occurring during each cycle. In the past, normal times for loading pellets in fuel rods ranged between 12 and 15 minutes. By using the above described structure, fuel rods now may be loaded between 58 and 90 seconds depending on the magnitude of armature-table displacement which may be controlled by utilizing a variable resistor in the rectifier power circuit.

In operation, with pellets positioned in grooves provided in the pellet tray 42, and fuel rods 44 in the grooves provided in the table surface, energization of the electromagnetic units 32 causes the table to vibrate in the manner described above. As the table is moved rearwardly and downwardly during the rectifier power cycle to impart tension to the springs, the pellets maintain their original position in the fuel rods because of friction between the pellet and each fuel rod inner surface. As the feeder coil 54 is deenergized during the negative half cycle, the magnetic forces are withdrawn, the energy imparted to spring mass 60 is released thus moving the table supporting the fuel rods upwardly and forwardly. As the table moves forwardly, pellets leave the fuel rod inner surface and become airborne for an instant and at a velocity greater than vibratory feeder movement. As the feeder nears the end of its stroke, pellet displacement continues until it moves a slight distance forward in the fuel rod. Upon repeating this cycle many times, the pellets are moved from the pellet grooves into the fuel rods and down the fuel rods until each rod is completely loaded with pellets.

It will be apparent, that both the table supporting the pellet tray and the table supporting the fuel rods may be vibrated independently of each other or synchronously, so that pellets may be fed continuously from the tray into the fuel rods, or the pellets may be fed manually into the fuel rods, all as dictated by the equipment which may be present to be utilized for these purposes.

It further will be apparent to those skilled in the art that instead of springs 60 acting as the table moving force, the armature may exert such force on the table. As the force F is relieved, the springs which at this time will be in tension, will act to move the table rearwardly and downwardly to commence a new cycle. This action will simply be the reverse of that described in the preferred embodiment.

The invention has been disclosed utilizing electromagnetic devices to produce the table moving force since this design has been found to be particularly successful in fuel rod loading production operations. Obviously, many other force producing arrangements may be used to impart vibratory motion to the table. For example, both pneumatic and hydraulic systems may be used which utilize conventional piston-cylinder arrangements wherein the piston is connected to the table and is actuated or moved by forces derived from pneumatic or hydraulic power sources, with appropriate venting to return the piston to a neutral position. Direct mechanical arrangements may be used, such as eccentrics or cams which serve to impart the desired degree of vibratory force to the table.

Accordingly, many modifications and variations may be made in light of the above teachings. It therefore is to be understood that within the scope of the appended claims, the invention may be practiced other than as specifically described.

I claim:

1. Apparatus for loading fuel pellets into fuel rods comprising:
   a base supporting a table having at least one row of fuel pellets thereon;
   at least one fuel rod secured to the table upper surface and positioned in alignment with said pellets;
   vibration means on said base connected with said table for imparting vibratory motion thereto;
   said vibration means being mounted at an angle to a horizontal plane passing through the base to cause said table upon movement of said vibrator to cyclically move in a forward-upwardly backward-downwardly motion thereby advancing each pellet in each fuel rod a predetermined distance during each cycle.

2. Apparatus according to claim 1 wherein the surface of said table passes through a plane parallel to the base.

3. Apparatus according to claim 1 wherein the surface of said table is mounted at an angle to the horizontal.

4. Apparatus according to claim 1 wherein said table is supported by said vibration means.

5. Apparatus according to claim 1 wherein damping means located between said vibration means and said base for dissipating forces which otherwise would be transmitted into the base.

6. Apparatus according to claim 1 wherein said vibration means comprises an electromagnetic device.

7. Apparatus according to claim 6 wherein said electromagnetic device comprises a housing having an electromagnet therein and a movable armature associated therewith;
   flexible means mounted on said housing and connected with said armature;
   bracket means interconnecting said armature with said table, the arrangement being such that upon energization of said electromagnet, the armature is caused to cyclically move the table in one direction and the flexible means returns the table to its initial position to thereby advance said pellets in the fuel rod.

8. Apparatus according to claim 7 wherein said flexible means comprises springs secured at their ends to said housing and having their central portion attached to the armature.

* * * * *